United States Patent
Park

(10) Patent No.: US 6,402,226 B2
(45) Date of Patent: Jun. 11, 2002

(54) CAB TORSION PREVENTING STRUCTURE OF TRUCK

(75) Inventor: Jae-Hong Park, Ulsam (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/730,013

(22) Filed: Dec. 4, 2000

(30) Foreign Application Priority Data

Dec. 29, 1999 (KR) .............................................. 99-64681

(51) Int. Cl.$^7$ .............................................. B60R 27/00
(52) U.S. Cl. .......................... 296/170.08; 296/203.02; 296/194; 296/29
(58) Field of Search ................ 296/190.08, 203.02, 296/194, 29, 30

(56) References Cited

U.S. PATENT DOCUMENTS

| | | | |
|---|---|---|---|
| 5,011,201 A | * | 4/1991 | Takahashi et al. .......... 296/203 |
| 5,303,973 A | * | 4/1994 | Fuji .......................... 296/194 |
| 5,560,674 A | * | 10/1996 | Tazaki et al. ............. 296/30 X |
| 5,597,198 A | * | 1/1997 | Takanishi et al. .......... 296/194 |
| 5,743,590 A | * | 4/1998 | Baumann .................... 296/194 |
| 6,145,923 A | * | 11/2000 | Masuda ....................... 296/194 |

FOREIGN PATENT DOCUMENTS

| | | | | |
|---|---|---|---|---|
| JP | 404059489 A | * | 2/1992 | ............ 296/203.02 |
| SU | 1409513 A1 | * | 7/1988 | ............ 296/190.08 |

* cited by examiner

Primary Examiner—Joseph D. Pape
Assistant Examiner—Lori L Coletta
(74) Attorney, Agent, or Firm—Christie, Parker & Hale, LLP

(57) ABSTRACT

A cab torsion preventing structure of truck wherein a reinforcing material is installed to form a closed space at a connected area between a wheel housing and a head lamp support panel to increase strength relative to load and torsional moment applied to the wheel housing, and to dispense with thicker wheel housing and head lamp support panel, preventing cracks at the connected area, the structure comprising the reinforcing material, one side of which being combined to an inner surface of the wheel housing and the other side being coupled to the head lamp support panel, thereby forming a closed space at a connected area between the head lamp support panel and the wheel housing for dispersion of load.

3 Claims, 4 Drawing Sheets

CAB TORSION PREVENTING STRUCTURE OF TRUCK

CROSS-REFERENCE TO RELATED APPLICATION(S)

This application claims priority of Korean Patent Application No. 99-64681, filed on Dec. 29, 1999.

BACKGROUND OF THE INVENTION

The present invention relates to a torsion preventing structure, and more particularly to a cab torsion preventing structure of a truck adapted to improve the resistant strength of a head lamp support panel and wheel housing comprising the cab of truck.

DESCRIPTION OF THE PRIOR ART

Generally, a truck consists of a cab comprising a driver's seat and a cargo box for loading cargoes.

As depicted in FIG. 3, the cab and the cargo box are accommodated to a frame (not shown), where engine, transmission, suspension and the like are all supported to the frame. A cab 52 is mounted on a floor 51 sitting on a frame 50 and the cab 52 includes a wheel housing 53, a head lamp support panel 54 and the like.

The wheel housing 53 and the head lamp support panel 54 are welded, and as shown in FIG. 4 for illustrating that the head lamp support panel 54 and the wheel housing 53 are connected by welding while a bumper is removed from "A" section of FIG. 3, the head lamp support panel 54 is welded thereunder to a longitudinal end of flange 55 while the head lamp support panel 54 is connected at both sides thereof by a front end cross member 56.

At this location, the head lamp support panel 54 and the front end cross member 56are formed in plate shape as they do not receive heavy load, however, the wheel housing 53 is formed in a "∩" cross-sectional shape to improve strength because the housing 53 receives the shock directly from load of the cab 52 and roadbed.

Of course, the front end cross member 56, the head lamp support panel 54 and the wheel housing 53 are welded while they are mutually overlapped, such that the load and torsional moment applied to the connected region from the wheel housing 53 are dispersed and absorbed.

However, there is a problem in that a simple construction connecting the wheel housing and the head lamp support panel cannot fully absorb and disperse load or torsional moment applied to the wheel housing through tires and axles from the load of cab and the roadbed, resulting in cracks and the like at the connected region.

There is another problem in that increasing the thickness of the wheel housing and head lamp support panel for preventing the cracks and the like only increases truck weight and manufacturing cost.

SUMMARY OF THE INVENTION

The present invention is disclosed to solve the aforementioned problems and it is an object of the present invention to provide cab torsion preventing structure of a truck constructed to prevent the generation of cracks at a connected area between a wheel housing and a head lamp support panel without recourse to increasing the thickness at the wheel housing and the head lamp support panel.

In accordance with the objects of the present invention, there is provided a cab torsion preventing structure of truck, the structure including a cab perpendicularly combined head lamp support panel and wheel housing, the structure comprising of a reinforcing material, one side of which being combined to an inner surface of the wheel housing and the other side being coupled to the head lamp support panel, thereby forming a closed space at a connected area between the head lamp support panel and the wheel housing for dispersion of load.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
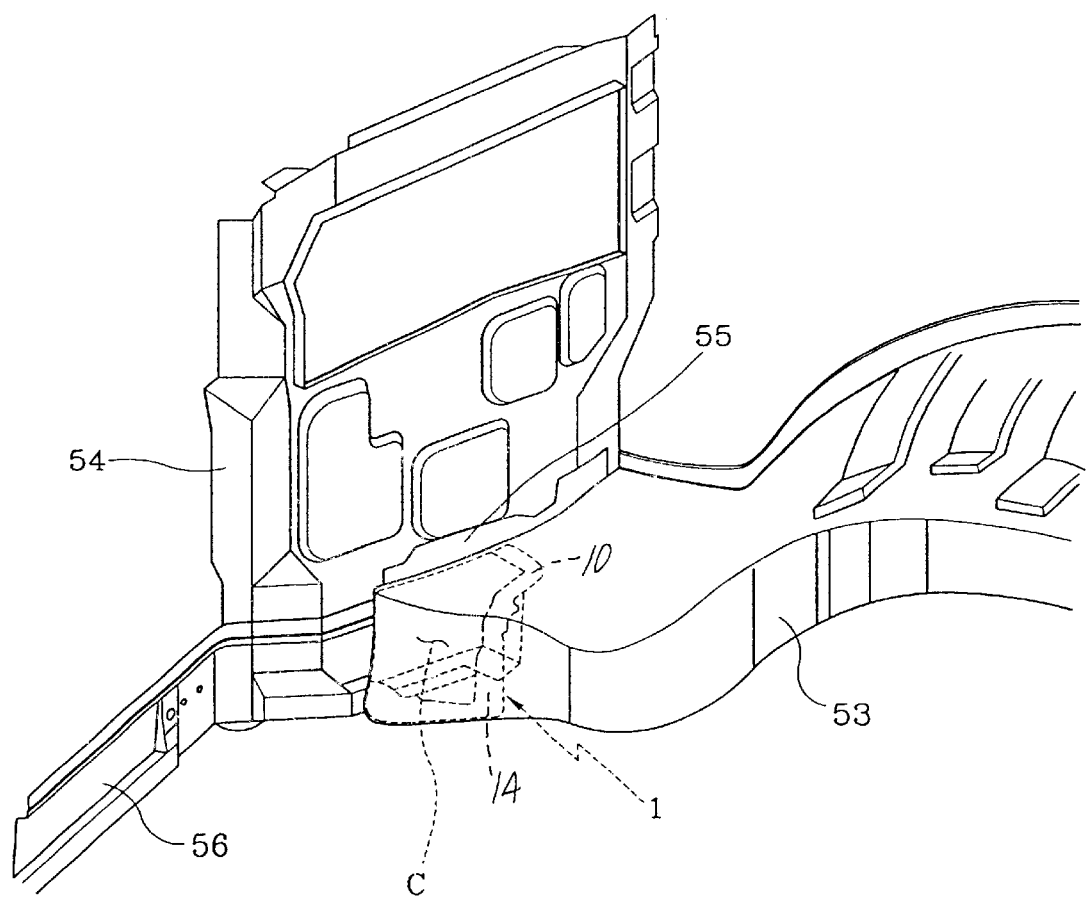
FIG. 1 is a perspective view for illustrating a cab torsion preventing structure of a truck according to the present invention.
Figure 2:
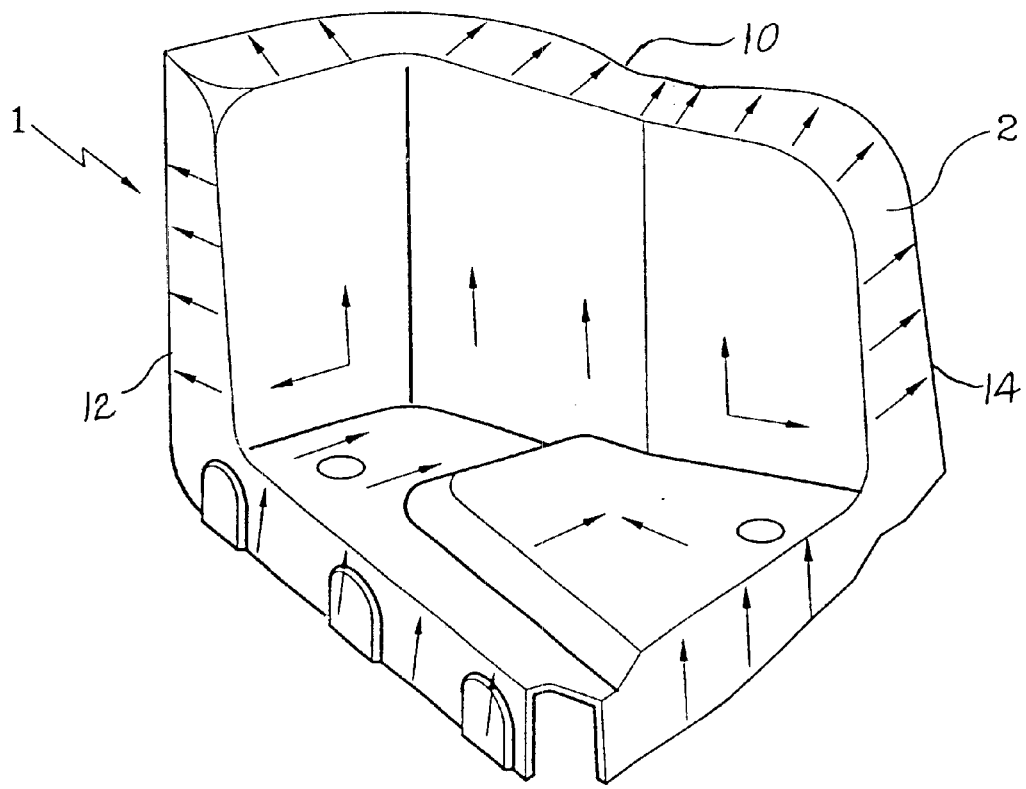
FIG. 2 is a perspective view for illustrating a reinforcing material shown in FIG. 1.
Figure 3:
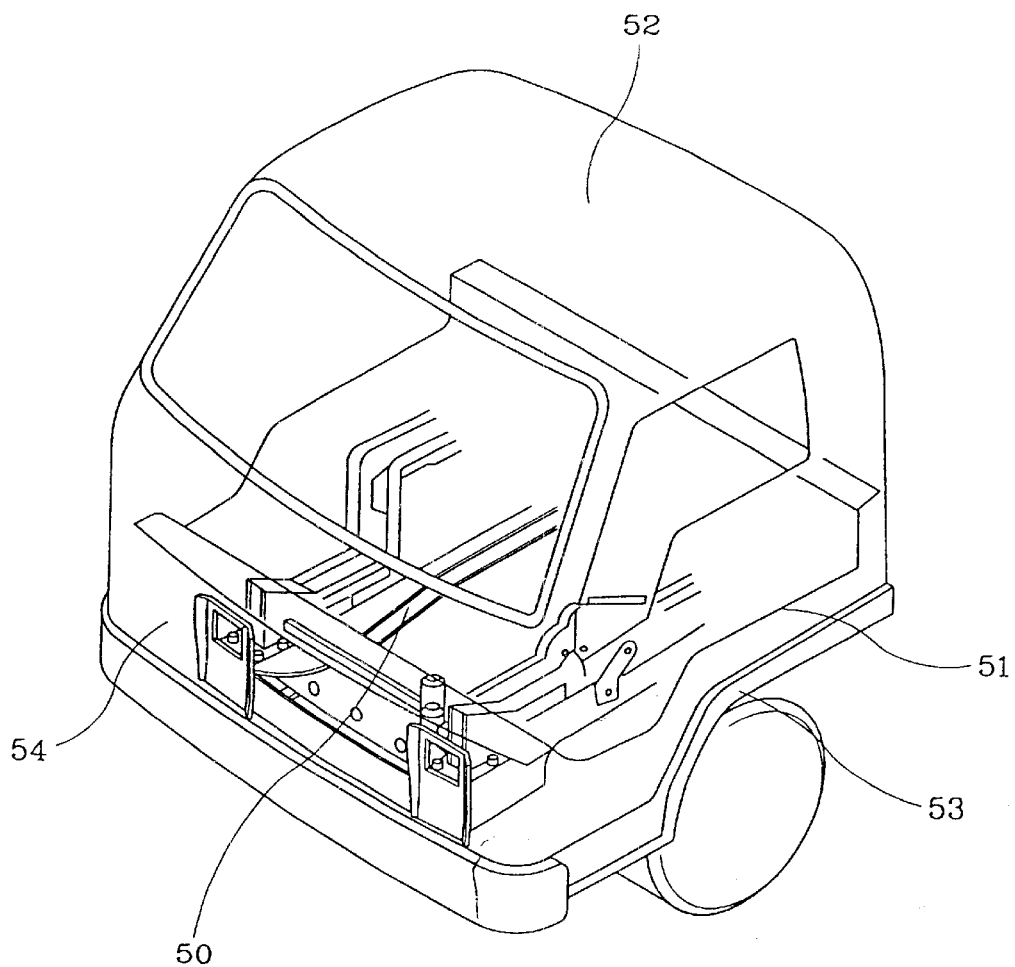
FIG. 3 is a schematic perspective view for illustrating an arranged state of cab, floor and frame of a truck according to the prior art.
Figure 4:
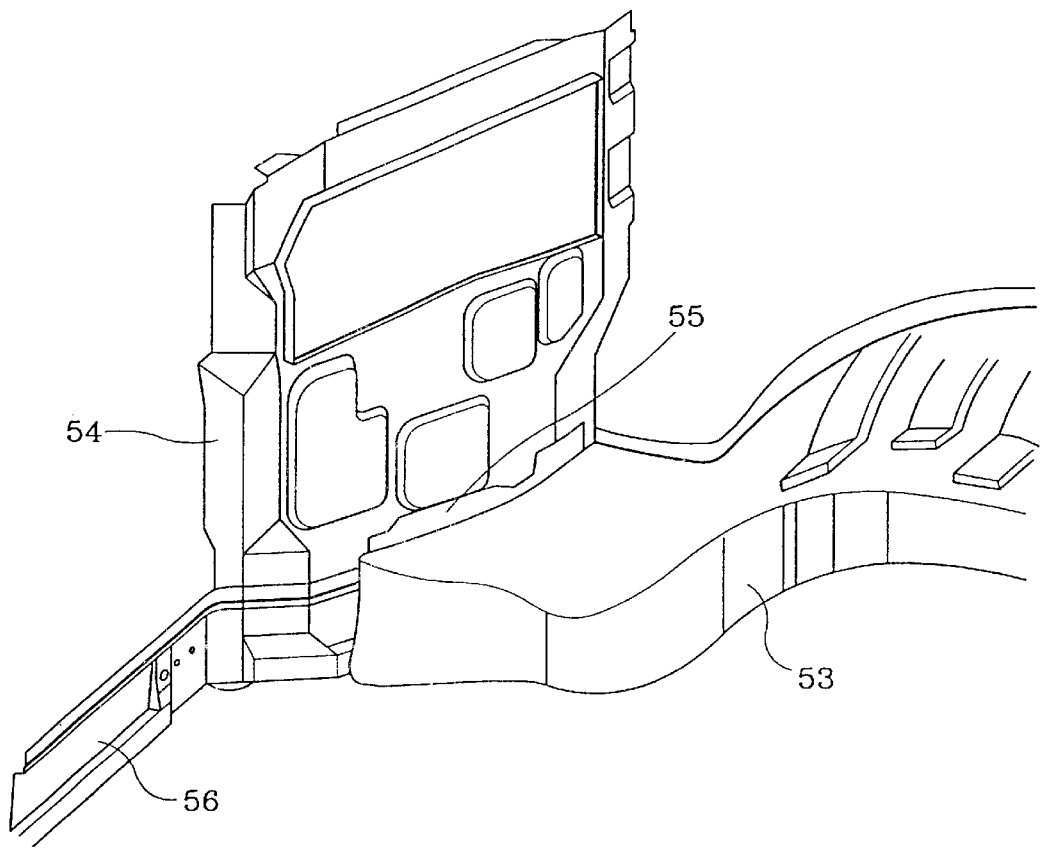
FIG. 4 is an enlarged perspective view of the "A" part in FIG. 3.

FIG. 1 is a perspective view for illustrating a cab torsion preventing structure of a truck according to the present invention and FIG. 2 is a perspective view for illustrating a reinforcing material shown in FIG. 1, wherein the structure comprises a reinforced material 1, one side of which being combined to an inner surface of a wheel housing 53 and the other side being coupled to a head lamp support panel 54, thereby forming a closed space at a connected area between the head lamp support panel 54 and the wheel housing 53 for dispersion of load.

The reinforcing material 1 is generally triangularly shaped such that an upper side 10, a left side 12 and a right side 14 thereof are formed with flanges 2 so as to be welded with corner parts of the wheel housing 53 and the head lamp support panel 54.

The upper side and right side of the reinforcing material flange 2 are welded to an inner surface of and upper inner side of the wheel housing 53 while the left side thereof is welded to the head lamp support panel 54, such that a closed triangular-shaped "C" is formed by the wheel housing 53, the head lamp support panel 54 and the reinforcing material 1.

When the closed space C is created by the wheel housing 53 and the head lamp support panel 54, the load and torsional moment transmitted from the wheel housing 53 are not directly transferred to the connected area between the wheel housing 53 and the head lamp support panel 54 to thereby prevent generation of cracks at the connected area.

Particularly, the connected area between the wheel housing 53 and the head lamp support panel 54 is increased in strength thereof by the closed space C and as indicated by arrows in FIG. 2, the load and torsional moment transmitted to the wheel housing 53 are dispersed to the front, rear, left and right sides thereof, thereby improving the dispersion efficiency and improving the strength at the connected area.

Now, operational effect of the present invention thus described will be explained.

First of all, a worker assembles the head lamp support panel 54 and the wheel housing 53 while creating a cab 52.

When the wheel housing 53 and the head lamp support panel 54 are combined, reinforcing material 1 is adhered to the connected area, where the upper surface and right surface of the reinforcing material flange 2 are adhered to an inner surface of the wheel housing 53 while the left surface thereof is secured to the head lamp support panel 54.

The flange 2 of the reinforcing material 1 is abutted to the wheel housing 53 and the head lamp support panel 54 and is welded thereto for combination when the assembly of the cab 52 is completed, the cab 52 is mounted with parts such as cargo box, engine and the like.

When the truck assembly is finished, the truck is run for test, where torsional moment generated by load of the cab 52 and shock from the roadbed is transmitted to the wheel housing 53 during the road testing.

When the load of the cab 52 and torsional moment are applied to the wheel housing 53, the load and moment tend to be transmitted to the head lamp support panel 54 but instead are transmitted to the closed space C by the reinforcing material 1.

The load and torsion moment are transferred to the closed space C the force tending to deform the reinforcing material 1 but are effectively scattered to the head lamp support panel 54 and the front end cross member 56 such that the reinforcing material 1 is not deformed.

In other words, the closed space C formed by the reinforcing material 1 is resistant to and withstands high load and torsional moment before the reinforcing material 1 breaks.

As a result, a thick panel used in the prior art truck can be dispensed with, thereby avoiding an increase in the weight of the truck.

As apparent from the foregoing, there is an advantage in the cab torsion preventing structure of a truck thus described according to the present invention in that a reinforcing material is installed to form a closed space at a connected area between a wheel housing and a head lamp support panel to increase strength relative to load and torsional moment applied to the wheel housing.

What is claimed is:

1. A torsion preventing structure of a truck, the structure including a head lamp support panel, a wheel housing, and a reinforcing material, wherein the head lamp support panel is attached to, and is substantially perpendicular to the wheel housing, and further wherein a side of the reinforcing material is attached to an inner surface of the wheel housing, and another side is attached to the head lamp support panel, thereby forming a closed space between the wheel housing and the head lamp support panel for the dispersion of load.

2. The structure as defined in claim 1, wherein the reinforcing material is triangularly shaped and includes an upper side, a left side, and a right side each side including a flange, wherein the upper and right sides are attached to the wheel housing and the left side is attached to the head lamp support panel.

3. The structure of claim 1, wherein the reinforcing material is welded to the wheel housing and the head lamp support panel.

* * * * *